United States Patent [19]

Shiojiri

[11] 4,141,059
[45] Feb. 20, 1979

[54] PHOTOGRAPHIC FLASH DEVICE

[75] Inventor: Shosaku Shiojiri, Osaka, Japan

[73] Assignee: West Electric Company, Ltd., Osaka, Japan

[21] Appl. No.: 843,044

[22] Filed: Oct. 17, 1977

[30] Foreign Application Priority Data

Oct. 29, 1976 [JP] Japan .................................. 51-145981

[51] Int. Cl.² ............................................. G03B 15/02
[52] U.S. Cl. ......................................... 362/18; 362/16;
362/280; 362/306; 362/307; 362/311; 362/319;
362/341
[58] Field of Search .................... 362/16, 18, 311, 280,
362/306, 307, 319, 341

[56] References Cited

U.S. PATENT DOCUMENTS 4,066,884   1/1978   Taylor ..................................... 362/16

Primary Examiner—Stephen J. Lechert, Jr.
Attorney, Agent, or Firm—Cushman, Darby & Cushman

[57] ABSTRACT

A photographic flash device comprising
a flash tube disposed in a case and a converging lens disposed in front of the flash tube, the improvement is that
the converging lens is mounted on the front part of a slidable frame which slidably and permanently engages with the case at the front part thereof in a manner to enable adjustment of distance between the converging lens and said flash tube so as to change angle of divergence of flashed light, and a space inside the frame is covered by a protecting cover.

6 Claims, 8 Drawing Figures

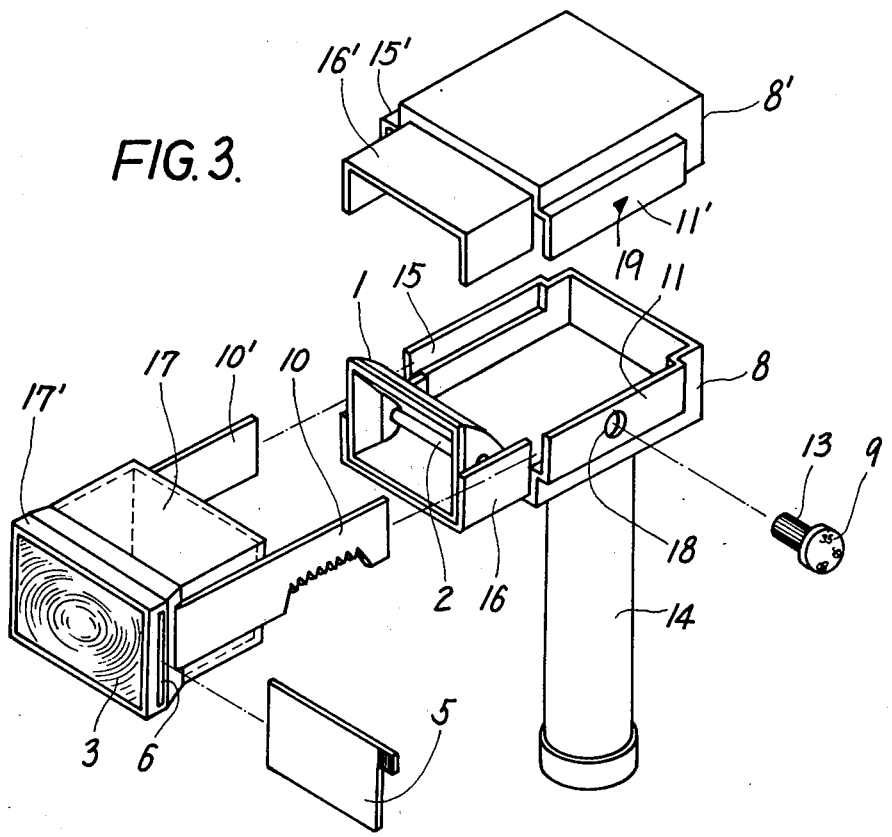
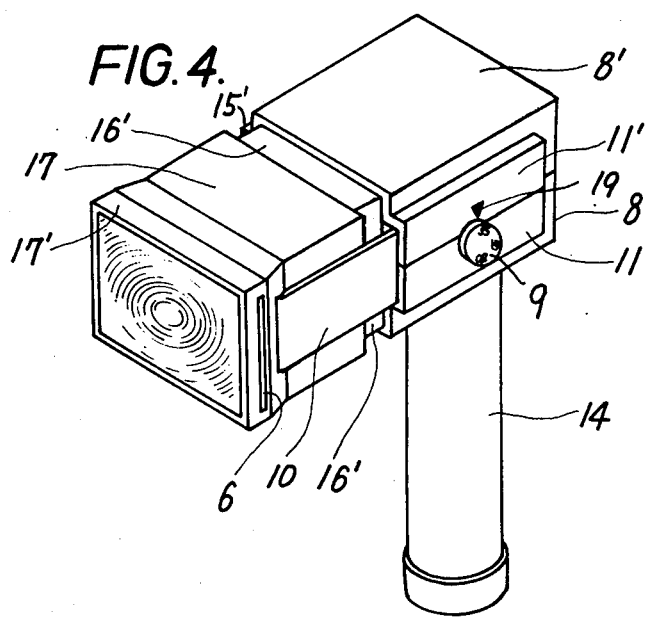

PHOTOGRAPHIC FLASH DEVICE

BACKGROUND OF THE INVENTION

1. Field of the Invention

The present invention relates to a photographic flash device to be used to project an artificial light for photographing, and more particularly to a photographic flash device capable of using for photographing with lenses of various focal lengths.

2. Background of the Invention

Generally speaking, a photographic flash device should project light with angle of divergence corresponding to angle of photography of a photographing lens used. Namely, for a photographing by standard lens the angle of divergence of the flash light should be of medium, for photographing by a telephoto lens the angle of divergence of the flash light should be narrower than the standard case in order to save the light not to wastely illuminate surrounding part around a real photographic object for the telephoto lens and to concentrate, and hence strengthen, the light intensity for the real photographic object, and for a photographing by wide angle lens the angle of divergence of the flash light should be wider than the standard case in order not to fail illuminating peripheral part of a photographic object.

It is known that a longest distance for which a photographing can be made and an angle of divergence of flashed light are inversely related. Namely, when the angle is the narrower, the light is the more concentrated, and hence enables photographing of the farer object, and when the angle is the wider a photographing is limited to the nearer object.

For the abovementioned reason, in order to enable flash illumination for photographing by various lenses, some improvements have been proposed. One example of such conventional improvement is to provide a flash device with several movable reflection mirrors which are to be moved for obtaining lights of various divergence angles. Another example of the conventional improvement is to provide a flash device with detachable or exchangable converging lens(es) in front of flash tube. The former conventional improvement has a shortcoming of large size and complex construction because of including two reflection mirrors, while the latter conventional improvement has a shortcoming of necessitating several lenses and hence of possible losing of the lenses. Still another example of the conventional improvement is to provide a flash device with a detachable converging lens holded on a detachable arm, which also has a shortcoming of losing the arm and or lens and further likely damaging the lens due to an uncovered construction thereof.

SUMMARY OF THE INVENTION

In accordance with the present invention, a new and useful photographic flash device is disclosed for use in photographing by lenses of various focal length. The present invention purports to provide a compact photographic flash device without shortcoming of losing detachable or exchangeable lens and possible damaging of lens.

The present invention provide a compact photographic flash device capable of continuously changing the angle of divergence of flashed light corresponding to photographic lenses of various focal length(s) used for photographing.

BRIEF EXPLANATION OF THE DRAWING

FIG. 3 is a knocked down perspective view of an example of the present invention.

FIG. 4 is a perspective view of the example of FIG. 3.

DESCRIPTION OF THE PREFERRED EMBODIMENT

Figure 1:
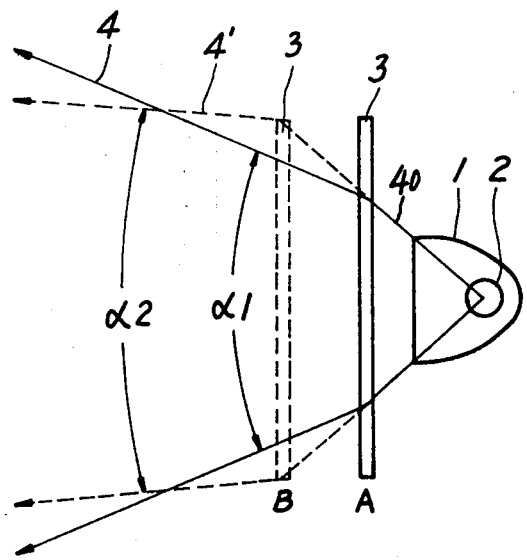
FIG. 1 is chart explaining the principle of the present invention.

FIG. 1 schematically illustrates section of light beams of a photographic flash device, wherein a flash tube 2 disposed in a space of a refraction mirror 1 flashes light by discharging an electric charge in a capacitor and projects light 40 which passes through a converging lens, for example, a fresnel lens 3 disposed in front of the flash tube 2. When the fresnel lens 3 is disposed in a closer position A, the light beam widely diverges as shown by the solid lines 4, 4, making a wider angle of divergence α1. When the fresnel lens 3 is disposed in a more apart position B, the light path moderately diverges as shown by the dotted lines 4', 4', making a narrower angle of divergence α2.

Provided that the light intensity is constant and the distance from the flash device to a photographic object (not shown) is also constant, and that a flash light of an appropriate intensity for a standard (medium size) photographic object at the constant distance is given by the flash device when the fresnel lens 3 is disposed in the position A, then, when the fresnel lens 3 is shifted to the more apart position B and the divergence angle α2 becomes narrower than the angle α1 and the light 4' is more concentrated than the light 4, a greater intensity of flashed light is given to the object. Therefore, in this case, with the fresnel lens 3 at the position B, the light intensity is too strong for the same stop with the photographing with the position A of the fresnel lens 3, while the divergence angle is too narrow for the standard photographic object. In other words, with the fresnel lens at a more apart position, a narrower but stronger light is obtainable. Therefore, for a telephoto photographing, wherein a photographic object is far and the angle of photographing is narrow, such narrowly converged flash light is preferable. Then exposure of the photography becomes appropriate.

Light intensity GN of a flash device is usually indicated by guide number GN, which is defined by the following equation:

$$GN = F \times D,$$

wherein, F designates stop value of a camera lens used for the photographing and D designates distance from the flash device to the photographic object.

Figure 2:
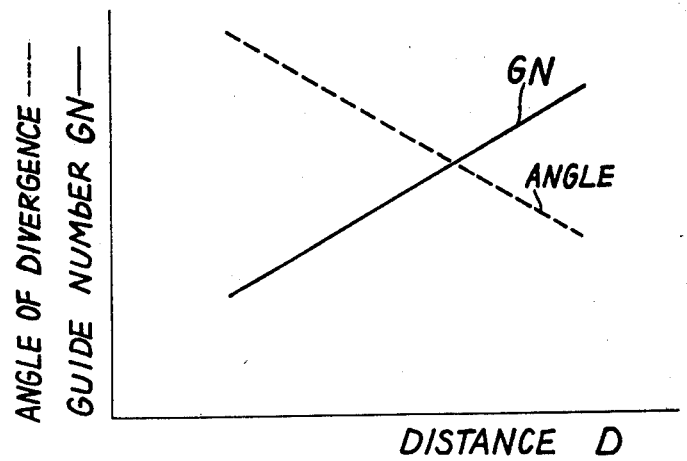
FIG. 2 is a graph showing relation between guide number (GN) and the distance to the photographing object and relation between angle of divergence α and the distance.

When the fresnel lens 3 in FIG. 1 is at the position B, the light intensity at the photographic object becomes larger than the appropriate value, and therefore, in order to obtain appropriate exposure for the object at the same distance the stop of the camera lens should be adjusted to increase the stop value F. Instead, in order to obtain appropriate exposure for the object with the same stop value, the distance from the flash device to the photographic object may be increased. Namely, effective guide number (represented as a number of F × D) of the flash device is increased as a result of shifting the fresnel lens 3 from the position A to the position B. FIG. 2 shows relation between the guide number GN and the distance D, as well as the relation between the angle of divergence of the flash light and the possible longest photographing distance. As shown in FIG. 2, in order to increase the distance D, the guide number GN must be increased, or the angle of the divergence must be decreased.

The flash device in accordance with the present invention purports to change the angle of divergence by shifting the position of the fresnel lens, thereby to increase possible longest photographing distance to the photographic object.

Figure 5A:
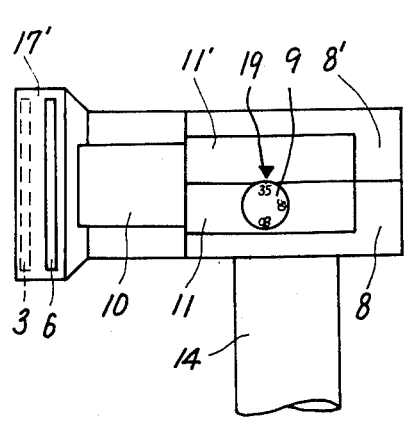
FIG. 5A and FIG. 5B are side views of a principal part of the example of FIGS. 3 and 4.
Figure 5B:
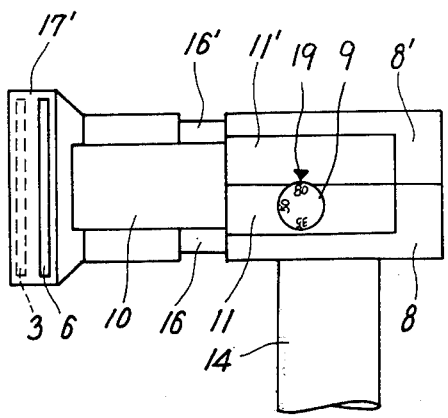

FIG. 3 to FIG. 5B show an example of the present invention, wherein FIG. 3 is a knocked down perspective view, FIG. 4 is an assembled perspective view, FIG. 5A is a side view of the flash device adjusted for use for a wide angle photographic lens and FIG. 5B is a side view of the flash device adjusted for use for a telephoto photographic lens.

In FIG. 3, a lower half part 8 and an upper half part 8′ form a case 8—8′ which contains a reflection mirror 1 in the front end part 16—16′ thereof, a flash tube 2 in the space of the reflection mirror 1 and known electric circuit (not shown) for operating the flash tube. A cylinder part 14 connected underneath the lower half part 8 contains batteries and a main capacitor for storing electric charge. The upper half 8 and the lower half 8′ have expanded side walls 11′, 15′ and 11, 15 on both sides thereof. The expanded walls 11 and 11′, as well as 15 and 15′ form sliding guide grooves on both sides of the case 8—8′. A slidable front member comprises a rectangular parallelopiped-shaped cover 17 secured to the sliding frames 10 and 10′ at both sides faces and to the front frame 17′ on its open front end, the rear end of the cover being open. One of the sliding frame 10 has rack 12 thereon. A fresnel lens 3 as converging lens is fixed on the front frame 17′. A slit 6 for inserting a panel such as color-temperature conversion panel 5 is formed on the front frame 17′ and immediately behind the fresnel lens 3. The sliding frames 10 and 10′ are slidably inserted in the sliding guides 11—11′ and 15—15′ of the assembled case 8—8′, so that the fresnel lens 3 mounted on the front frame 17′ can be slidably adjusted forward and backward. A pinion 13 with a dial 9 on top thereof is inserted in a hole 18 on the expanded side wall 11 in a manner to engage with the rack 12 and make the sliding frames 10 and 10′ to slide along the sliding guides 11—11′ and 15—15′. A pointer mark 19 is provided on the expanded side wall 11′ so as to indicate the numerals of angles of divergence or focal lengths of photographic lens. The cover 17 slidably overlaps on the outside face of the front end part 16—16′ of the case 8—8′ in order to protect the flash tube 2.

Operation of the flash device of the abovementioned example is elucidated referring to FIGS. 5A and 5B. By rotating the dial 9, the sliding frame 10 is driven forward and backward by means of engagement of the pinion 13 and rack 12, or by directly pulling or pushing the front frame 17′ from the case 8—8′, the front member is driven forward and backward, thereby slidingly shifting the distance between the fresnel lens 3 and the flash tube 2. Therefore, the divergence angle of the flash light can be changed from a narrow angle corresponding to a photographing with a wide angle photographing lens, for example, with a focal length of 35mm as shown in FIG. 5A, to a narrow angle corresponding to a photographing with a telephote photographing lens, for example, with a focal length of 80mm as shown in FIG. 5B. Since the dial 9 indicates the focal length of the photographing lens for which the divergence angle of the flash device is adjusted, the adjustment can be done easily and accurately by simply rotating the dial 9 in a manner that the pointer mark 19 point a numeral of desired focal length.

Figure 6A:
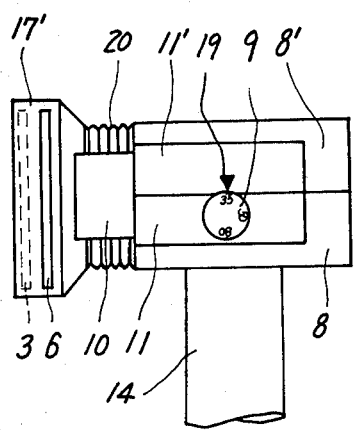
FIG. 6A and FIG. 6B are side views of a principal part of another example.
Figure 6B:
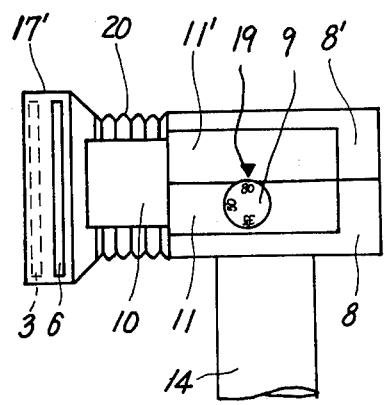

FIGS. 6A and 6B show a modified example wherein a bellows 20 is provided connecting between the front end of the case 8—8′ and the rear end of the front frame 17′. Other parts are similarly constructed with the foregoing example. FIG. 6A shows the case where the flash device is adjusted for use for a wide angle photographing, and FIG. 6B shows the case where the flash device is adjusted for use for a telephoto lens photographing.

Since the flash device of the present invention has the permanently and slidingly engaged converging lens, there is no need of exchanging or removing the converging lens. Accordingly, there is no fear of losing the lens.

Since the convergence lens is mounted in the frame and the cover is provided in the frame, there is no fear of damaging the converging lens, damaging the flash tube or staining the reflection mirror.

What I claim is:

1. In a photographic flash device comprising
   a reflector mirror,
   a flash tube disposed operatively in a space of said reflector mirror,
   a case enclosing said reflector mirror, said flash tube and an electric energizing means for supplying said lamp with an electric energy and
   a converging lens disposed in front of said flash tube and said reflector mirror,
   wherein the improvement comprises said device includes a sliding frame, which is slidably engaged with said case at the front part thereof, has an open space therein and holds said converging lens at its front end part in a manner to vary distance between said converging lens and said flash tube when the frame slides with respect to said case, and said open space surrounded by said converging lens and said sliding frame is covered by a protection cover.

2. A photographic flash device of claim 1, wherein said sliding frame has a rack and said case has a pinion which engages with said rack and has a dial to indicate divergence angle of the flash light.

3. A photographic flash device of claim 1, wherein said sliding frame is slidably received by a guiding groove formed by expanded part of side walls of said case.

4. A photographic flash device of claim 1, wherein said sliding frame has a means for holding a panel for converting characteristic of the flashed light.

5. A photographic flash device of claim 1, wherein said cover is a rectangular parallelopiped shaped tube mounted in a manner to slidably overlap by its open end on the open front end part of said case.

6. A photographic flash device of claim 1, wherein said cover is a bellows connecting the front end part of said case and the rear end of said front 041409616 end part of said sliding frame.

* * * * *